US009246428B2

(12) United States Patent
Yokozutsumi et al.

(10) Patent No.: US 9,246,428 B2
(45) Date of Patent: Jan. 26, 2016

(54) VECTOR CONTROL DEVICE FOR AN ELECTRIC MOTOR THAT CONTROLS AN ELECTRIC POWER CONVERTER THAT CONVERTS DC POWER TO AC POWER, ELECTRIC MOTOR, VEHICLE DRIVE SYSTEM, AND VECTOR CONTROL METHOD FOR ELECTRIC MOTOR

(75) Inventors: Ryo Yokozutsumi, Tokyo (JP); Yuruki Okada, Tokyo (JP); Hisanori Yamasaki, Tokyo (JP); Sho Kato, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 53 days.

(21) Appl. No.: 14/347,493

(22) PCT Filed: Sep. 30, 2011

(86) PCT No.: PCT/JP2011/072644
§ 371 (c)(1),
(2), (4) Date: Mar. 26, 2014

(87) PCT Pub. No.: WO2013/046461
PCT Pub. Date: Apr. 4, 2013

(65) Prior Publication Data
US 2014/0232307 A1 Aug. 21, 2014

(51) Int. Cl.
*H02P 21/00* (2006.01)
*H02P 27/08* (2006.01)
(Continued)

(52) U.S. Cl.
CPC ............ *H02P 21/0035* (2013.01); *H02P 6/002* (2013.01); *H02P 27/047* (2013.01); *H02P 27/085* (2013.01); *H02P 21/00* (2013.01)

(58) Field of Classification Search
CPC ... H02P 21/0035; H02P 21/06; H02P 21/146; Y02T 10/643
USPC ............. 318/400.02, 811, 599, 432, 434, 727
See application file for complete search history.

(56) References Cited

U.S. PATENT DOCUMENTS 5,680,299 A * 10/1997 Yasuda et al. .................... 363/41
6,225,774 B1 * 5/2001 Masaki et al. ................. 318/723
(Continued)

FOREIGN PATENT DOCUMENTS

JP 06-343201 A 12/1994
JP 2003-033097 A 1/2003
(Continued)

OTHER PUBLICATIONS

Office Action (Notice of Preliminary Rejection) issued on Mar. 22, 2015, by the Korean Intellectual Property Office in corresponding Korean Patent Application No. 10-2014-7007652, and an English translation of the Office Action. (9 pages).
(Continued)

*Primary Examiner* — Rina Duda
(74) *Attorney, Agent, or Firm* — Buchanan Ingersoll & Rooney PC

(57) ABSTRACT

A vector control device includes a vector control unit computing an output voltage output from the electric power converter according to vector control based on torque command and flux command and generating a PWM signal for controlling the electric power converter based on the output voltage, a first flux-command generation unit generating a flux command for asynchronous PWM mode, and a second flux-command generation unit generating a flux command for synchronous PWM mode. When an output frequency of the electric power converter is lower than a predetermined value, a flux command generated by the first flux-command generation unit is input to the vector control unit, and when the output frequency of the electric power converter is equal to or higher than a predetermined value, a flux command generated by the second flux-command generation unit is input to the vector control unit.

11 Claims, 5 Drawing Sheets

(51) Int. Cl.
　　　*H02P 27/04*　　　(2006.01)
　　　*H02P 6/00*　　　(2006.01)

(56) References Cited

U.S. PATENT DOCUMENTS

| | | | |
|---|---|---|---|
| 8,232,753 B2 * | 7/2012 | Shimada et al. | 318/400.09 |
| 8,497,648 B2 | 7/2013 | Tagome et al. | |
| 2004/0257028 A1 | 12/2004 | Schulz et al. | |
| 2005/0046369 A1 | 3/2005 | Kobayashi et al. | |
| 2009/0256518 A1 | 10/2009 | Kitanaka et al. | |
| 2010/0087971 A1 | 4/2010 | Yamasaki | |
| 2011/0043149 A1 | 2/2011 | Kitanaka | |
| 2011/0057591 A1 | 3/2011 | Tagome et al. | |
| 2012/0096881 A1 * | 4/2012 | Sakanobe et al. | 62/126 |

FOREIGN PATENT DOCUMENTS

| | | |
|---|---|---|
| JP | 2005-073307 A | 3/2005 |
| JP | 2007-525137 A | 8/2007 |
| JP | 2007-259538 A | 10/2007 |
| JP | 4065903 B | 1/2008 |
| JP | 2010-104234 A | 5/2010 |
| WO | WO 2008/107992 A1 | 9/2008 |
| WO | WO 2009/040884 A1 | 4/2009 |
| WO | 2009/144957 A1 | 12/2009 |
| WO | WO 2011/111262 A1 | 9/2011 |

OTHER PUBLICATIONS

Office Action (Notice of Rejection) issued on Jan. 27, 2015, by the Japanese Patent Office in corresponding Japanese Patent Application No. 2014-052074 and an English translation of the Office Action. (4 pages).

International Search Report (PCT/ISA/210) mailed on Dec. 27, 2011, by the Japanese Patent Office as the International Searching Authority for International Application No. PCT/JP2011/072644.

Written Opinion (PCT/ISA/237) mailed on Dec. 27, 2011, by the Japanese Patent Office as the International Searching Authority for International Application No. PCT/JP2011/072644.

Notice of Rejection for JP 2013-535798 dated Nov. 19, 2013 (6 pages).

\* cited by examiner

VECTOR CONTROL DEVICE FOR AN ELECTRIC MOTOR THAT CONTROLS AN ELECTRIC POWER CONVERTER THAT CONVERTS DC POWER TO AC POWER, ELECTRIC MOTOR, VEHICLE DRIVE SYSTEM, AND VECTOR CONTROL METHOD FOR ELECTRIC MOTOR

FIELD

The present invention relates to a vector control device for an electric motor, an electric motor, a vehicle drive system, and a vector control method for an electric motor.

BACKGROUND

A technique for executing vector control on an electric motor by using an inverter has been widely used (see, for example, Patent Literature 1 mentioned below). The vector control for the electric motor is a technique for managing and controlling a magnetic flux component and a torque component separately in a rotary coordinate system, and has been used also in control of an electric vehicle in recent years.

In an inverter for driving an electric vehicle, an asynchronous PWM mode, in which the carrier frequency does not depend on the frequency of an AC output voltage command, is used in a low-speed region. Thereafter, when an upper limit of a modulation factor obtained by asynchronous PWM control is exceeded, a synchronous PWM mode, in which the carrier frequency is an integral multiple of the frequency of an AC voltage command (for example, a synchronous three-pulse mode), is used, and a one-pulse mode is used in a high-speed region in which an output voltage is saturated and fixed to a maximum value.

CITATION LIST

Patent Literature

Patent Literature 1: Japanese Patent No. 4065903

SUMMARY

Technical Problem

However, according to the conventional technique mentioned above, in the asynchronous PWM mode, for example, control of increasing the output voltage by using constant flux command control is executed, and when the upper limit of the modulation factor obtained by the asynchronous PWM mode is exceeded, switching to the synchronous PWM mode is performed. On the other hand, in the synchronous PWM mode (particularly, in a one-pulse mode), a harmonic loss due to a ripple increases as compared to the asynchronous PWM mode. Therefore, if a region of the asynchronous PWM mode can be increased by decreasing a region of the synchronous PWM mode, the harmonic loss due to the ripple can be reduced. However, in the conventional technique, as described above, the output voltage is increased by the constant flux command control in the asynchronous PWM mode, and when the modulation factor reaches the upper limit, switching to the synchronous PWM mode is performed. Therefore, an operation region of the asynchronous PWM mode is limited. Accordingly, there is a problem in that the harmonic loss due to the ripple cannot be reduced.

The present invention has been achieved in view of the above and an object of the present invention is to provide a vector control device for an electric motor, an electric motor, a vehicle drive system, and a vector control method for an electric motor that can reduce a harmonic loss.

Solution to Problem

In order to solve the above problems and achieve the object, the present invention is a vector control device for an electric motor that controls an electric power converter that converts DC power to AC power and supplies the AC power to the electric motor, the device including: a vector control unit that computes an output voltage to be output from the electric power converter according to vector control based on a torque command and a flux command that are input, and generates a PWM signal for controlling the electric power converter based on the output voltage; a first flux-command generation unit that generates a flux command for an asynchronous PWM mode; and a second flux-command generation unit that generates a flux command for a synchronous PWM mode, wherein when an output frequency of the electric power converter is lower than a predetermined value, a flux command generated by the first flux-command generation unit is input to the vector control unit, and when the output frequency of the electric power converter is equal to or higher than a predetermined value, a flux command generated by the second flux-command generation unit is input to the vector control unit.

Advantageous Effects of Invention

According to the present invention, there is an effect in that it is possible to reduce a harmonic loss.

DESCRIPTION OF EMBODIMENTS

Exemplary embodiments of a vector control device for an electric motor and a vector control method for an electric motor according to the present invention will be explained below in detail with reference to the drawings. The present invention is not limited to the embodiments.

First Embodiment

Figure 1:
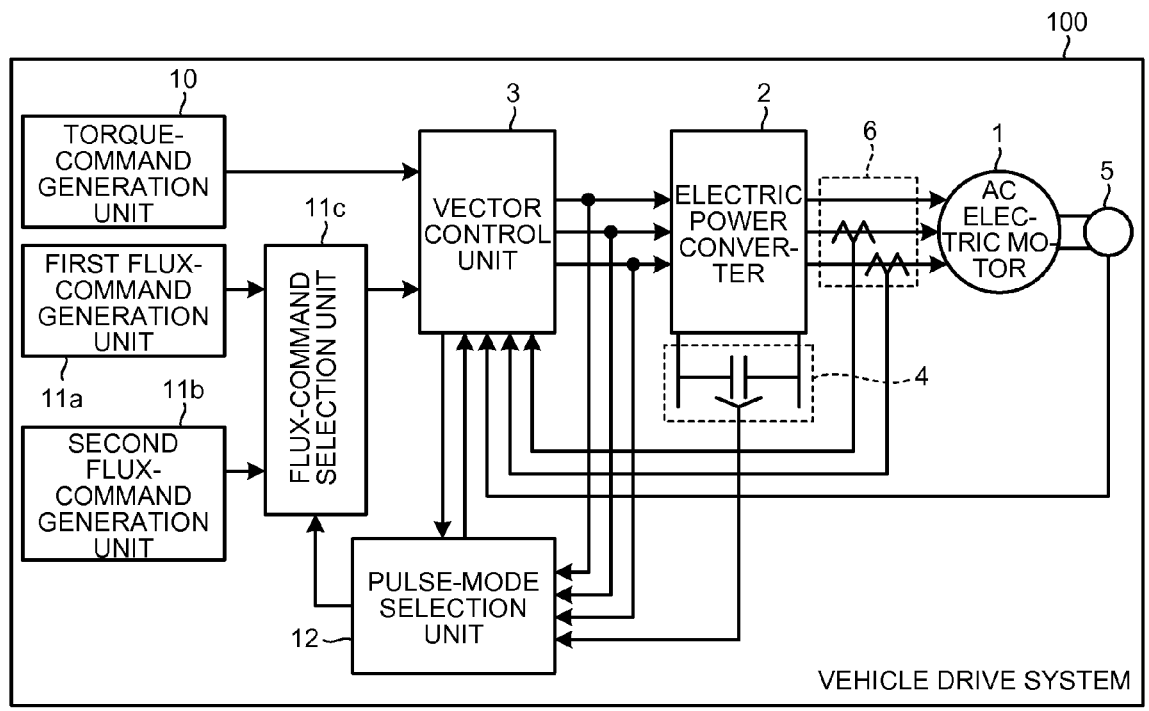
FIG. 1 is a diagram illustrating a configuration example of a vector control device for an electric motor according to a first embodiment.

FIG. 1 is a diagram illustrating a configuration example of a first embodiment of a vector control device for an electric motor according to the present invention. The vector control device for an electric motor according to the present embodiment controls an electric power converter 2 that executes drive control of an AC electric motor (electric motor) 1. As shown in FIG. 1, the vector control device for an electric motor according to the present embodiment includes a vector control unit 3, a DC-voltage detection unit 4, a speed detection unit 5, a current detection unit 6, a torque-command generation unit 10, a first flux-command generation unit 11a, a second flux-command generation unit 11b, a flux-command selection unit 11c, and a pulse-mode selection unit 12.

The electric power converter 2 includes switching elements and converts a DC voltage to an AC voltage based on a switching signal input from the vector control unit 3 to supply the AC voltage to the AC electric motor 1. The DC-voltage detection unit 4 detects the DC voltage applied to the electric power converter 2, and the current detection unit 6 detects currents of respective phases output from the electric power converter 2. The DC-voltage detection unit 4 may detect the respective currents of three phases. However, the DC-voltage detection unit 4 only needs to detect currents of at least two phases, and a current of the remaining one phase can be calculated by computing. The speed detection unit 5 detects the rotation speed of the AC electric motor 1. When a speed sensorless vector control method in which the speed detection unit 5 is not provided and the rotation speed of the AC electric motor 1 is calculated by computing is adopted, the speed detection unit 5 may not be provided.

The torque-command generation unit 10 generates a torque command and inputs the torque command to the vector control unit 3. The vector control unit 3 performs a vector control computation for controlling the electric power converter 2 such that a torque generated by the AC electric motor 1 matches the input torque command, based on the flux command input from the flux-command selection unit 11c, the torque command input from the torque-command generation unit 10, the current detected by the current detection unit 6, the rotation speed detected by the speed detection unit 5, and the motor constant of the AC electric motor 1. The vector control unit 3 calculates an AC output voltage command and an AC output voltage amplitude command as an operation result of the vector control computation, generates a switching signal by PWM control based on the calculated AC output voltage command and a pulse mode command input from the pulse-mode selection unit 12, and outputs the switching signal to the electric power converter 2. The electric power converter 2 performs an electric power conversion operation by the switching elements based on the switching signal (PWM signal), thereby driving the AC electric motor 1. The vector control unit 3 also outputs the frequency of the AC output voltage command (inverter output frequency) to the pulse-mode selection unit 12.

A control method of the vector control and the PWM control in the vector control unit 3 is not particularly limited, and a generally used control method can be used. In the present embodiment, the vector control unit 3 generates the switching signal. However, configurations thereof are not limited thereto. A switching-signal generation unit may be separately provided, the vector control unit 3 may output the AC output voltage command to the switching-signal generation unit, and the switching-signal generation unit may generate a switching signal based on the AC output voltage command and the pulse mode command and output the switching signal to the electric power converter 2.

The pulse-mode selection unit 12 determines the pulse mode based on the AC output voltage amplitude command, which is the operation result of the vector control unit 3, the DC voltage detected by the DC-voltage detection unit 4, and the inverter output frequency, and outputs the determined pulse mode to the vector control unit 3 and the flux-command selection unit 11c as a pulse mode command. A determination method of the pulse mode according to the present embodiment is described later.

In the PWM control of the present embodiment, two modes are defined as the pulse mode, that is, the asynchronous PWM mode, in which the carrier frequency does not depend on the inverter output frequency, and the synchronous PWM mode, in which the carrier frequency is synchronized with the inverter output frequency and is set to an integral multiple of the inverter output frequency. In the synchronous PWM mode, the pulse mode is classified according to how many multiples of the inverter output frequency the carrier frequency is. It is assumed here that a pulse mode in which the carrier frequency is N times (N is an integer equal to or larger than 1) the inverter output frequency is referred to as "synchronous N-pulse mode", and a synchronous one-pulse mode is referred to as "one-pulse mode" as it is generally referred to.

The first flux-command generation unit 11a computes a flux command value for the asynchronous PWM mode and outputs the flux command value to the flux-command selection unit 11c. The second flux-command generation unit 11b computes a flux command value for the synchronous PWM mode and outputs the flux command value to the flux-command selection unit 11c. The flux-command selection unit 11c selects one of the flux command input from the first flux-command generation unit 11a and the flux command input from the second flux-command generation unit 11b based on the pulse mode command output from the pulse-mode selection unit 12, and outputs the selected flux command to the vector control unit 3. Specifically, when the pulse mode command indicates the synchronous PWM mode, the flux-command selection unit 11c selects an output of the second flux-command generation unit 11b and outputs the selected output to the vector control unit 3. When the pulse mode command indicates the asynchronous PWM mode, the flux-command selection unit 11c selects an output of the first flux-command generation unit 11a and outputs the selected output to the vector control unit 3.

Figure 2:
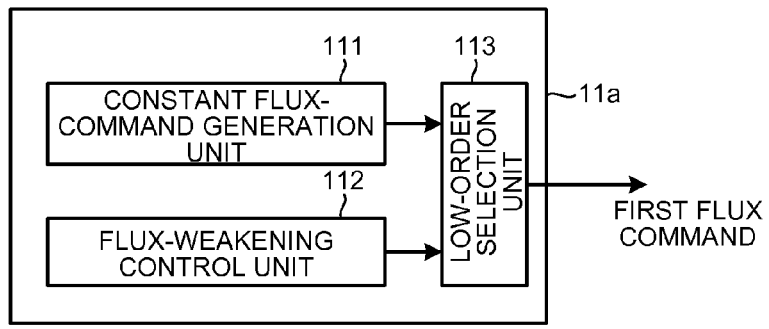
FIG. 2 is a diagram illustrating a configuration example of a first flux-command generation unit.

FIG. 2 is a diagram illustrating a configuration example of the first flux-command generation unit 11a according to the present embodiment. As shown in FIG. 2, the first flux-command generation unit 11a according to the present embodiment includes a constant flux-command generation unit 111, a flux-weakening control unit 112, and a low-order selection unit 113.

The constant flux-command generation unit 111 outputs constant rated secondary flux as a flux command. The rated secondary flux is generally secured as large as possible under such a condition that the iron core of the AC electric motor 1 is not magnetically saturated. However, the value of the rated secondary flux is not particularly limited.

The flux-weakening control unit 112 generates a flux command by so-called flux weakening control in which field flux is decreased to increase the rotating speed, and outputs the generated flux command to the low-order selection unit 113. In the flux weakening control, the flux is decreased while setting the AC output voltage constant (that is, the modulation factor is set constant). Conventionally, the flux weakening control is generally executed after the AC output voltage becomes near the maximum value and the pulse mode is switched to the one-pulse mode. However, in the present embodiment, the flux weakening control is executed when the modulation factor becomes equal to or higher than a first threshold in the asynchronous PWM mode. That is, the flux-weakening control unit 112 executes the flux weakening control such that the modulation factor becomes the first threshold to generate a flux command. As the first threshold, a value smaller than a second threshold is set. The second threshold is a threshold of the modulation factor in the second flux-command generation unit 11b described later.

As the first threshold, for example, if a value equal to or smaller than a boundary value of 78.5% (0.785) of overmodulation in the asynchronous PWM mode is set, even when the rated secondary flux is set to the same value as in the conventional techniques, a region of the asynchronous PWM mode can be enlarged as compared to the conventional techniques, without causing overmodulation. A value exceeding 78.5% may be set as the first threshold; however, in this case, control corresponding to overmodulation is executed. For example, a control method described in '"Actual theory and design of AC servo system", pp 39-46, 1990, Sogo Electronics Press' can be applied to the control described above.

The low-order selection unit 113 selects a lower-order flux command of the flux command output from the constant flux-command generation unit 111 and the flux command output from the flux-weakening control unit 112 and outputs the selected flux command to the flux-command selection unit 11c.

With the above operation, the first flux-command generation unit 11a can output the flux command by constant flux control when the modulation factor is lower than the first threshold, and can output the flux command by the flux weakening control when the modulation factor is equal to or higher than the first threshold.

The second flux-command generation unit 11b includes the constant flux-command generation unit 111, the flux-weakening control unit 112, and the low-order selection unit 113 similarly to the first flux-command generation unit 11a. The constant flux-command generation unit 111 in the second flux-command generation unit 11b outputs a constant flux as a flux command in a similar manner to the constant flux-command generation unit 111 in the first flux-command generation unit 11a. However, the constant flux-command generation unit 111 in the second flux-command generation unit 11b does not output the rated secondary flux described above, but outputs a flux command at the time of switching from the asynchronous PWM mode to the synchronous PWM mode as a constant value. For example, the flux-command selection unit 11c holds the output flux command and notifies the second flux-command generation unit 11b of the flux command input from the first flux-command generation unit 11a when the mode is switched from the asynchronous PWM mode to the synchronous PWM mode. The constant value of the flux command to be output from the constant flux-command generation unit 111 is not limited thereto, and for example, a preset value may be used.

The flux-weakening control unit 112 of the second flux-command generation unit 11b executes the flux weakening control such that the modulation factor becomes the second threshold to generate a flux command. The second threshold may be 100%. However, the second threshold here is set to a value lower than 100%, such as 95%. The low-order selection unit 113 of the second flux-command generation unit 11b selects a lower-order (smaller) flux command of the flux command output from the constant flux-command generation unit 111 of the second flux-command generation unit 11b and the flux command output from the flux-weakening control unit 112 of the second flux-command generation unit 11b, and outputs the flux selected command to the flux-command selection unit 11c.

With the operation described above, the second flux-command generation unit 11b can output a flux command obtained by the constant flux control when the modulation factor is lower than the second threshold, and can output a flux command obtained by the flux weakening control when the modulation factor is equal to or higher than the second threshold. The configuration example shown in FIG. 2 is only an example, and it is not limited to the configuration example shown in FIG. 2 as long as the same operation as those in the first flux-command generation unit 11a and the second flux-command generation unit 11b can be performed.

The second flux-command generation unit 11b executes control of suppressing the modulation factor to lower than the second threshold by using the constant flux control and the flux weakening control. However, the flux control method in the second flux-command generation unit 11b is not limited to these control methods as long as the modulation factor is suppressed to a value lower than the second threshold.

Figure 3:
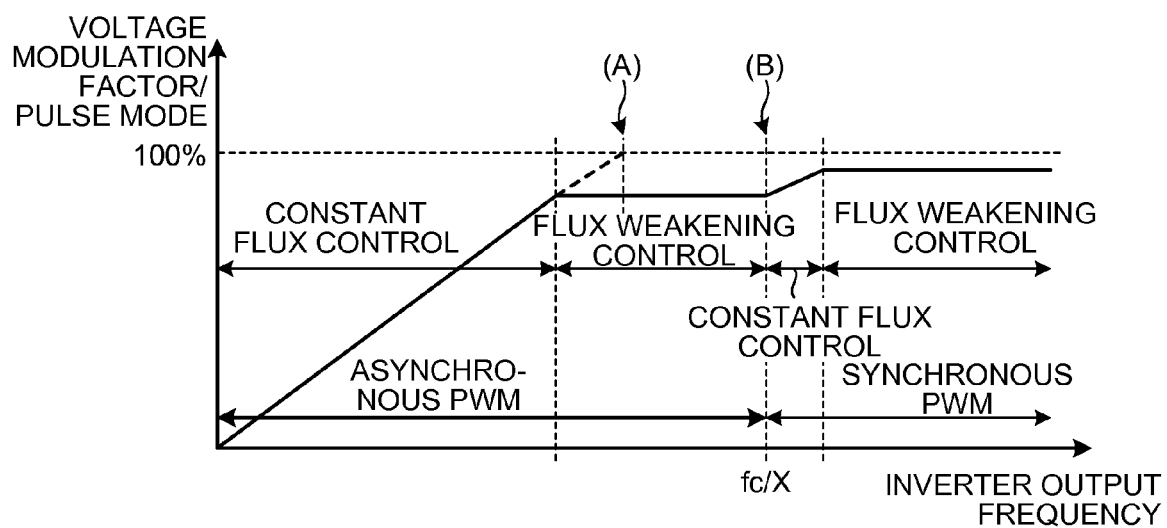
FIG. 3 is a diagram illustrating an example of a modulation factor and a pulse mode according to the first embodiment.
Figure 4:
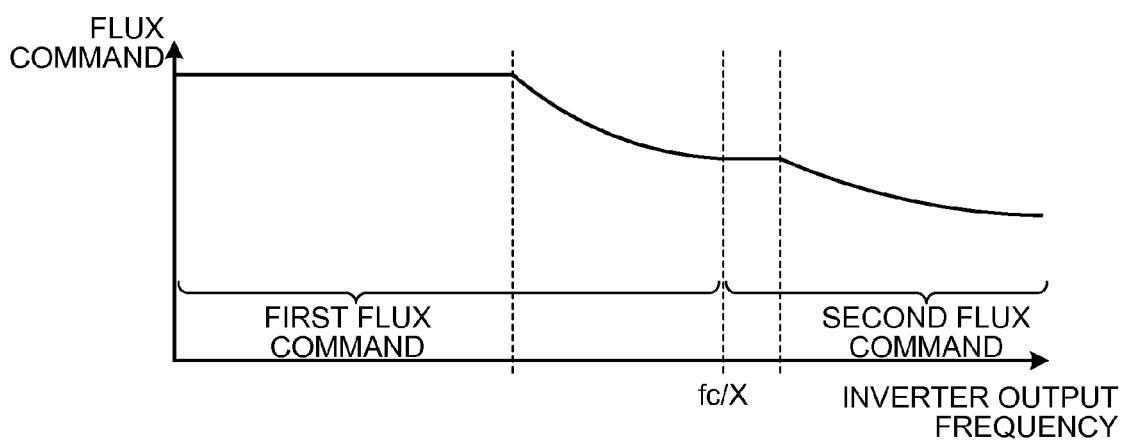
FIG. 4 is a diagram illustrating an example of a flux command according to the first embodiment.

FIG. 3 is a diagram illustrating an example of a modulation factor (voltage modulation factor) and a pulse mode according to the present embodiment. FIG. 4 is a diagram illustrating an example of a flux command according to the present embodiment. In FIGS. 3 and 4, the horizontal axis indicates the inverter output frequency. The determination method of the pulse mode according to the present embodiment is explained with reference to FIGS. 3 and 4. FIG. 4 depicts the flux command input to the vector control unit 3 when the control shown in FIG. 3 is executed. It is assumed here that the flux command output from the first flux-command generation unit 11a is a first flux command and the flux command output from the second flux-command generation unit 11b is a second flux command.

(A) in FIG. 3 indicates the inverter output frequency at which the modulation factor reaches 100% when the conventional technique (for example, the technique described in Patent Literature 1 mentioned above) is used. In the conventional technique, the modulation factor is increased by the constant flux control until the modulation factor reaches 100%. (B) in FIG. 3 indicates the inverter output frequency at which switching from the asynchronous PWM mode to the synchronous PWM mode according to the present embodiment is performed.

According to the present embodiment, the asynchronous PWM mode is switched to the synchronous PWM mode based on the inverter output frequency. Specifically, for example, in a region in which the inverter output frequency is lower than fc/X, the asynchronous PWM mode is used, and in a region in which the inverter output frequency is equal to or higher than fc/X, the synchronous PWM mode is used. Here, fc denotes the carrier frequency in the asynchronous PWM mode and is set independently of the inverter output frequency (for example, set to 1 kilohertz). X denotes "carrier frequency fc/inverter output frequency" at a switching point from the asynchronous PWM mode to the synchronous PWM mode. A value of X is determined while taking into consideration the inductance characteristic of the AC electric motor 1 and the inverter output frequency so that a current ripple, that is, a low-order harmonic component of the current due to switching becomes equal to or less than a predetermined allowable value at (B), which is a minimum frequency in the synchronous PWM mode.

The carrier frequency fc in the asynchronous PWM mode is set such that the switching loss of the electric power converter 2 becomes equal to or less than the allowable value. That is, the minimum frequency in the synchronous PWM mode (mode switching frequency) shown by (B) in FIG. 3 is determined based on the carrier frequency fc, the allowable value of the current ripple in the synchronous PWM mode, and the inductance characteristic of the electric motor. A specifying method of the inverter output frequency (mode switching frequency), which becomes the switching condition from the asynchronous PWM mode to the synchronous PWM mode, is not limited to the form of fc/X.

As shown in FIGS. 3 and 4, in the region where the modulation factor is lower than the first threshold, the constant flux control using the flux command generated by the constant flux-command generation unit 111 of the first flux-command generation unit 11a is executed. When the modulation factor becomes equal to or higher than the first threshold, the flux weakening control using the flux command generated by the flux-weakening control unit 112 of the first flux-command generation unit 11a is executed.

When the inverter output frequency becomes equal to or higher than fc/X, switching to the synchronous PWM mode is performed. Thereafter, in a region where the modulation factor is lower than the second threshold, the constant flux control using the flux command generated by the constant flux-command generation unit 111 of the second flux-command generation unit 11b is executed. When the modulation factor becomes equal to or higher than the second threshold, the flux weakening control using the flux command generated by the flux-weakening control unit 112 of the second flux-command generation unit 11b is executed.

In the synchronous PWM mode, the pulse mode may be changed in the synchronous PWM mode as in Patent Literature 1 mentioned above such that a synchronous three-pulse mode is used when the modulation factor is less than a constant value (the second threshold described above) and the one-pulse mode is used when the modulation factor becomes the constant value or higher. However, there is no limitation on the pulse mode in the synchronous PWM mode.

According to the present embodiment, the pulse mode is switched between the asynchronous PWM mode and the synchronous PWM mode based on the inverter output frequency. However, the asynchronous PWM mode and the synchronous PWM mode may be switched similarly based on the rotation speed detected by the speed detection unit 5.

Figure 5:
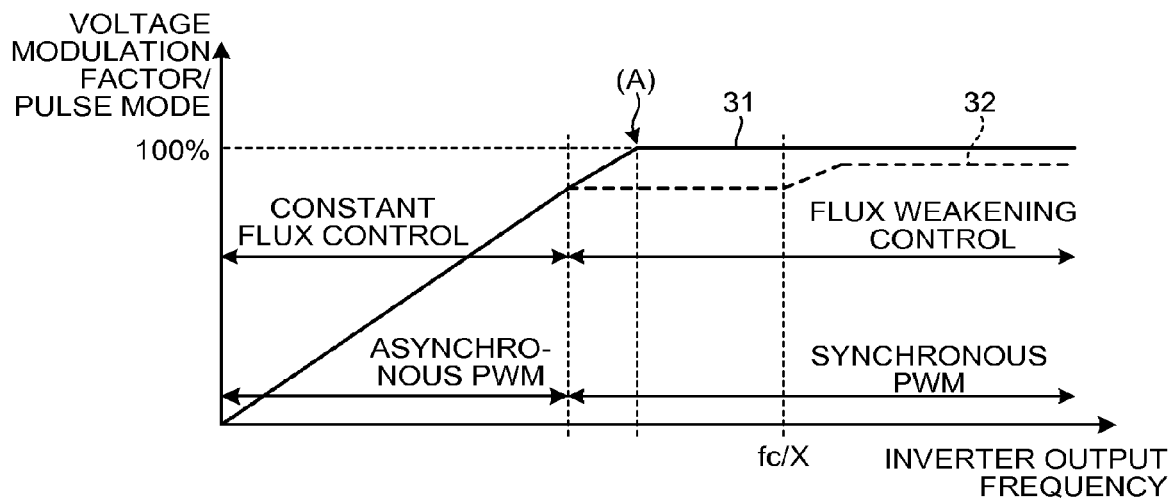
FIG. 5 is a diagram illustrating an example of a modulation factor and a pulse mode according to a conventional technique.
Figure 6:
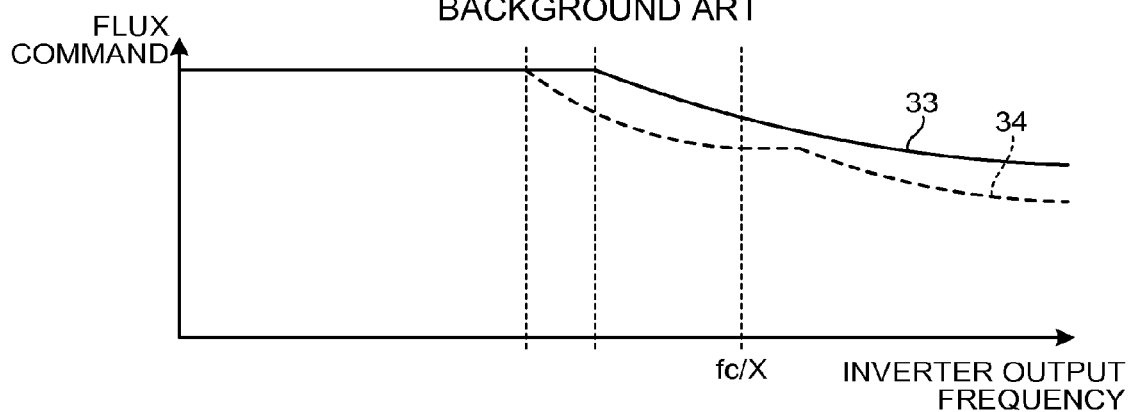
FIG. 6 is a diagram illustrating an example of a flux command according to the conventional technique.

FIG. 5 is a diagram illustrating an example of a modulation factor (voltage modulation factor) and a pulse mode according to the conventional technique (the technique described in Patent Literature 1 mentioned above). A modulation factor 31 shown in FIG. 5 indicates a modulation factor according to the conventional technique and a modulation factor 32 indicated by a dotted line indicates a modulation factor according to the present embodiment (the modulation factor shown in FIG. 3). FIG. 6 is a diagram illustrating an example of a flux command according to the conventional technique (the technique described in Patent Literature 1 mentioned above). A flux command 33 in FIG. 6 indicates a flux command according to the conventional technique, and a flux command 34 indicated by a dotted line indicates a flux command according to the present embodiment (the flux command shown in FIG. 4).

In the control method according to the conventional technique, as shown in FIG. 5, the constant flux control is executed until the modulation factor reaches a constant value (for example, 78.5%), and when the modulation factor exceeds the constant value, switching to the synchronous PWM mode (synchronous three-pulse mode) is performed. Thereafter, when the modulation factor reaches 100%, switching to the one-pulse mode is performed to execute the flux weakening control. Therefore, in the conventional technique, the region of the asynchronous PWM mode is limited to a period from the time when the modulation factor is increased by the constant flux control until it reaches the constant value.

In contrast, in the present embodiment, as described later, switching from the asynchronous PWM mode to the synchronous PWM mode is determined based on the inverter output frequency, and the asynchronous PWM mode is used until the inverter output frequency satisfies the switching condition to the synchronous PWM mode. Therefore, if the mode switching frequency (fc/X) is set higher than the inverter output frequency ((A) in FIG. 5 and FIG. 3) at which the modulation factor becomes 100% as shown in FIG. 3, in the present embodiment, the region of the asynchronous PWM mode can be enlarged as compared to the conventional technique. According to the present embodiment, the mode switching frequency is set higher than the inverter output frequency at which the modulation factor becomes 100% as shown in FIG. 3, thereby enlarging the asynchronous PWM mode as compared to the conventional technique.

Figure 7:
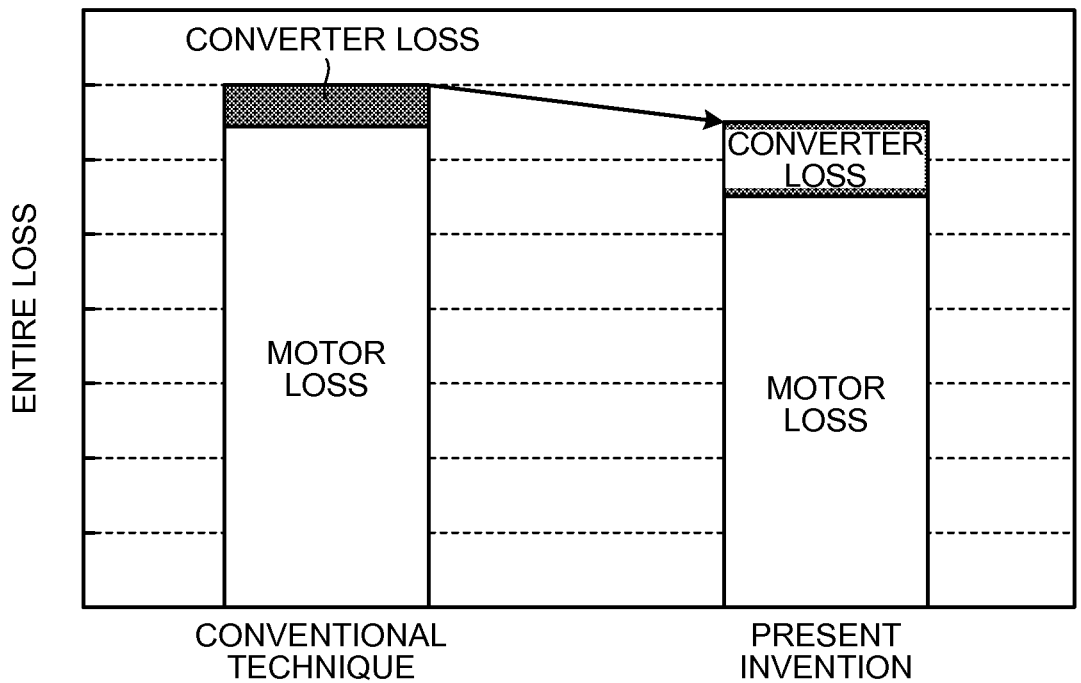
FIG. 7 is a diagram illustrating an example of an effect of the first embodiment in comparison with that of the conventional technique.

FIG. 7 is a diagram illustrating an example of an effect of the present embodiment in comparison with that of the conventional technique. In FIG. 7, a loss in the conventional technique (the technique described in Patent Literature 1 mentioned above) is shown on the left side, and a loss in the invention of the present application is shown on the right side. The loss shown in FIG. 7 indicates a loss of the entire system when the system is operated from the position where the inverter output frequency is zero to the inverter output frequency at the position shown by (B) in FIG. 3.

In the low-frequency region, in the asynchronous PWM mode having a sufficient number of times of switching, the harmonic loss of the AC electric motor 1 can be reduced more than that in a case where the AC electric motor 1 is driven in the synchronous PWM mode. Therefore, according to the present embodiment, the harmonic loss of the AC electric motor 1 can be reduced in the low-frequency region as compared to the conventional technique, by enlarging the region where the AC electric motor 1 is driven in the asynchronous PWM mode. Although the loss of the electric power converter 2 (converter loss) increases with an increase of the switching speed, the loss of the entire system can be reduced under an operating condition in which the reduction effect of a motor loss becomes dominant.

When the frequency increases, a high-frequency electric current of the AC electric motor 1 decreases due to an increase in impedance of the AC electric motor 1, and thus the harmonic loss is also reduced. Therefore, in a higher speed region than (B) in FIG. 3, the motor loss does not increase even if the synchronous PWM mode having a less number of times of switching is adopted, and a reduction effect of the converter switching loss can be acquired. Accordingly, the flux command is switched to the second flux command to operate such that the modulation factor is increased.

As described above, the harmonic loss of the electric motor is reduced by applying the vector control device according to the present embodiment and thus the combined loss with a fundamental wave loss is minimized; therefore, the loss of the entire electric motor can be reduced, thereby enabling the cooling performance to be suppressed. Therefore, reduction in size and weight of the electric motor can be realized by reviewing a cooling fin shape and a cooling air passage of the electric motor.

Any element may be used as the switching elements and the diode elements of the electric power converter 2, and for example, a wide bandgap semiconductor can be used. As the wide bandgap semiconductor, for example, there is one made of silicon carbide, gallium nitride material, or diamond. The switching elements and the diode elements formed of such a wide bandgap semiconductor have a high voltage resistance and a high allowable current density, and therefore can be reduced in size. By using the switching elements and diode elements reduced in size, a semiconductor module having these elements incorporated therein can be reduced in size.

Because the wide bandgap semiconductor has a high heat resistance, downsizing of a radiator fin of a heat sink and air cooling of a water cooling unit are possible, thereby enabling further downsizing of the semiconductor module. Further, because the power loss is low, it is possible to enhance efficiency of the switching elements and the diode elements, thereby enabling the semiconductor module to be highly efficient.

In this manner, in the present embodiment, the first flux-command generation unit 11a that generates a flux command for the asynchronous PWM mode and the second flux-command generation unit 11b that generates a flux command for the synchronous PWM mode are provided. The first flux-command generation unit 11a generates a flux command such that the modulation factor is suppressed to be equal to or lower than the first threshold corresponding to the asynchronous PWM mode. Switching from the asynchronous PWM mode to the synchronous PWM mode is performed based on the inverter output frequency. Therefore, the region of the asynchronous PWM mode can be enlarged as compared to the conventional techniques, thereby enabling the entire loss to be reduced.

Second Embodiment

Figure 8:
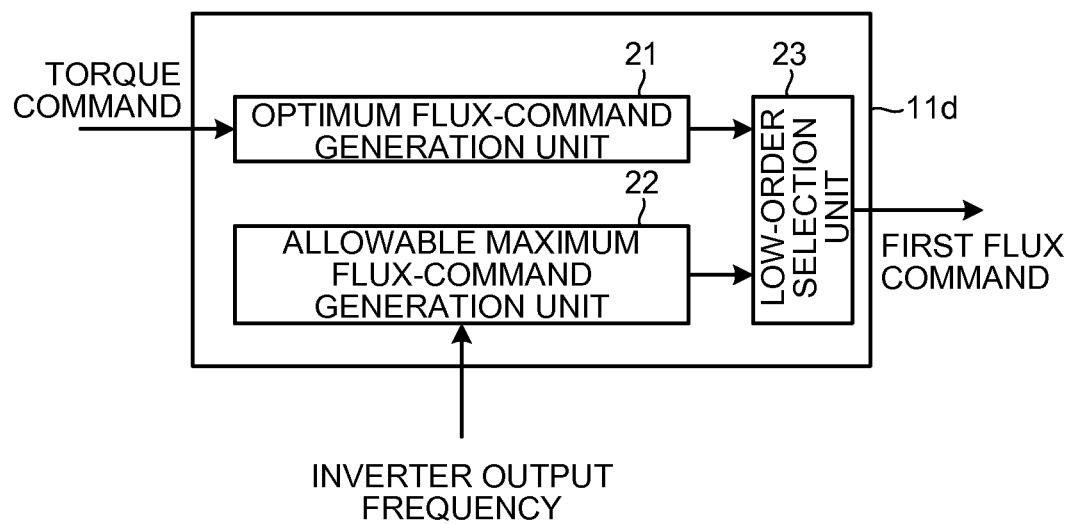
FIG. 8 is a diagram illustrating a configuration example of a first flux-command generation unit of a vector control device for an electric motor according to a second embodiment.

FIG. 8 is a diagram illustrating a configuration example of a first flux-command generation unit 11d of a second embodiment of a vector control device for an electric motor according to the present invention. The vector control device for an electric motor according to the present embodiment is the same as the vector control device for an electric motor according to the first embodiment, except for the inclusion of the first flux-command generation unit 11d instead of the first flux-command generation unit 11a of the vector control device for an electric motor according to the first embodiment. The first flux-command generation unit 11d of the present embodiment includes an optimum flux-command generation unit 21, an allowable maximum flux-command generation unit 22, and a low-order selection unit 23.

The optimum flux-command generation unit 21 generates a flux command satisfying a loss minimizing condition (efficiency maximizing condition), for example, as shown in FIG. 2 and explanations of International Publication No. WO2008/107992. The flux value satisfying the efficiency maximizing condition can be obtained for each torque command as described in International Publication No. WO2008/107992. Therefore, the optimum flux-command generation unit 21 holds in advance magnetic flux to be the loss minimizing condition for each torque command as a characteristic in the form of a function, a table, or the like, to obtain a flux command satisfying the efficiency maximizing condition based on the torque command and the characteristic held therein.

The allowable maximum flux-command generation unit 22 generates a maximum flux command that can be output depending on the inverter output frequency. For example, the allowable maximum flux-command generation unit 22 can generate the maximum flux command that can be output according to a calculation method of the maximum voltage secondary flux command described in claim 3 of Patent Literature 1 mentioned above.

The low-order selection unit 23 selects a lower-order flux command of the flux command generated by the optimum flux-command generation unit 21 and the flux command generated by the allowable maximum flux-command generation unit 22, and outputs the selected flux command to the flux-command selection unit 11c. Operations of the present embodiment other than those described above are the same as those of the first embodiment.

In a similar manner, a second flux-command generation unit 11e (not shown) having a similar configuration to the first flux-command generation unit 11d may be provided instead of the second flux-command generation unit 11b. In this case, the allowable maximum flux-command generation unit 22 of the second flux-command generation unit 11e generates magnetic flux such that the modulation factor becomes higher than that of the allowable maximum flux-command generation unit 22 of the first flux-command generation unit 11d.

The configurations of the first flux-command generation unit and the second flux-command generation unit are not limited to those described in the first and second embodiments, and, for example, may be identical to those of claim 1 in Patent Literature 1 mentioned above and claim 1 in International Publication No. WO2008/107992.

The configuration may be such that both the first flux-command generation unit 11a according to the first embodiment and the first flux-command generation unit 11d according to the present embodiment are provided and a lower-order flux command of the flux command generated by the first flux-command generation unit 11a and the flux command generated by the first flux-command generation unit 11d is input to the flux-command selection unit 11c.

As described above, the first flux-command generation unit 11d that executes optimum flux control is provided. Accordingly, effects similar to those of the first embodiment can be acquired, and the loss can be reduced as compared to the first embodiment.

Third Embodiment

In the present embodiment, a vehicle drive system to which the vector control device explained in the first and second embodiments is applied is explained.

Figure 9:
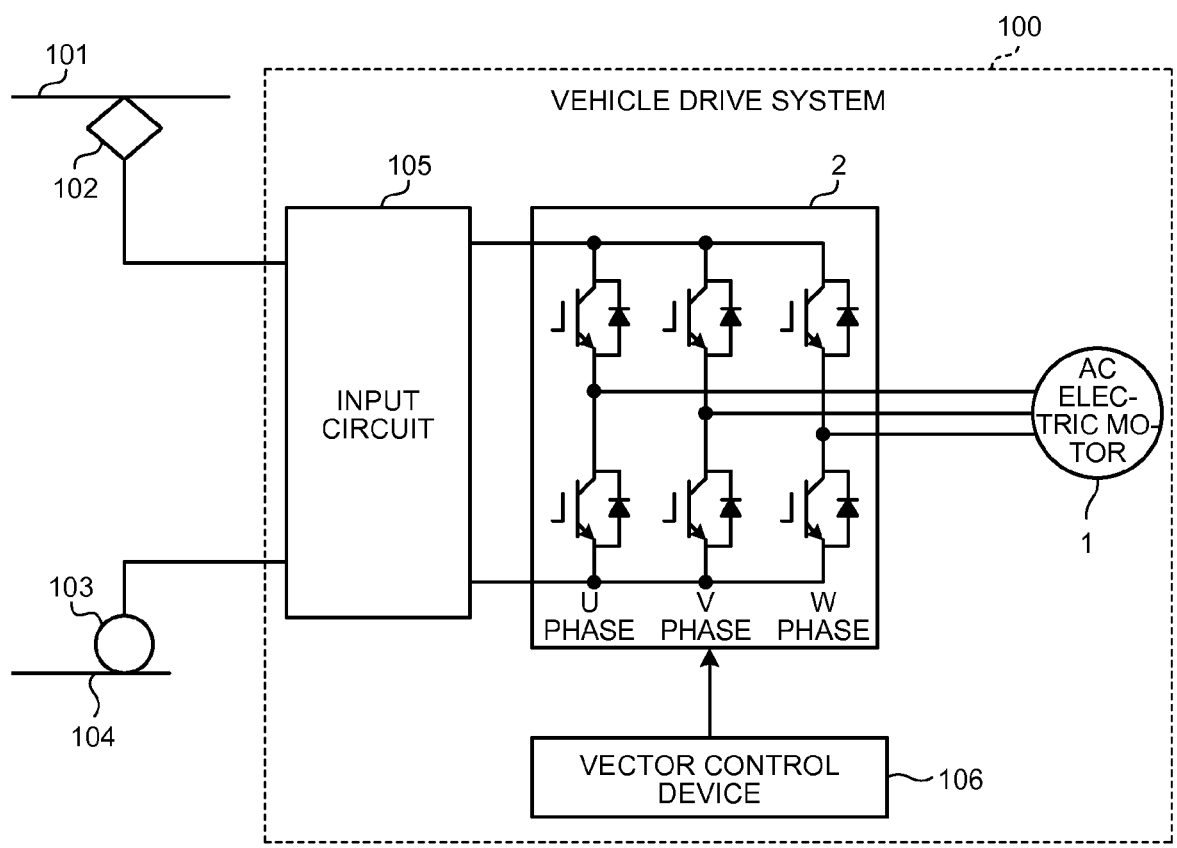
FIG. 9 is a diagram illustrating a configuration example of a vehicle drive system according to a third embodiment.

FIG. 9 is a diagram illustrating a configuration example in which the vehicle drive system is applied to a railway vehicle. A vehicle drive system 100 includes the AC electric motor 1, the electric power converter 2, an input circuit 105, and a vector control device 106. The AC electric motor 1 is the same as the AC electric motor 1 shown in FIG. 1 and is mounted on a railway vehicle. The electric power converter 2 is the same as the electric power converter 2 shown in FIG. 1 and converts DC power supplied from the input circuit 105 to AC power to drive the AC electric motor 1. The vector control device 106 corresponds to the vector control device explained in the first and second embodiments.

The input circuit 105 is configured to include a switch, a filter capacitor, a filter reactor, and the like, although not shown, and one end of the input circuit 105 is connected to an overhead contact line 101 via a power collector 102. The other end of the input circuit 105 is connected to a rail 104 being a ground potential via a wheel 103. The input circuit 105 receives supply of DC power or AC power from the overhead contact line 101 to generate DC power to be supplied to the electric power converter 2.

Accordingly, reduction in loss and size of the entire system can be realized by applying the vector control device according to the present embodiment to a vehicle drive system.

INDUSTRIAL APPLICABILITY

As described above, the vector control device for an electric motor, the electric motor, the vehicle drive system, and the vector control method for an electric motor according to the present invention are useful for a vector control device for controlling an AC electric motor, and are particularly suitable for a vector control device for controlling an AC electric motor in an electric vehicle.

REFERENCE SIGNS LIST

1 AC electric motor
2 electric power converter
3 vector control unit
4 DC-voltage detection unit
5 speed detection unit
6 current detection unit
10 torque-command generation unit
11a, 11d first flux-command generation unit
11b second flux-command generation unit
11c flux-command selection unit
12 pulse-mode selection unit
21 optimum flux-command generation unit
22 allowable maximum flux-command generation unit
100 vehicle drive system
105 input circuit
106 vector control device
111 constant flux-command generation unit
112 flux-weakening control unit
113, 23 low-order selection unit

The invention claimed is:

1. A vector control device for an electric motor that controls an electric power converter that converts DC power to AC power and supplies the AC power to the electric motor, the device comprising:
a vector control unit that computes an output voltage to be output from the electric power converter according to vector control based on a torque command and a flux command that are input, and generates a PWM signal for controlling the electric power converter based on the output voltage;
a first flux-command generation unit that generates a flux command for an asynchronous PWM mode and, when a modulation factor becomes equal to or higher than a first threshold, executes control of increasing a rotating speed by decreasing a field flux in the electric motor; and
a second flux-command generation unit that generates a flux command for a synchronous PWM mode, wherein
when an output frequency of the electric power converter is lower than a predetermined value, which is higher than the output frequency when the modulation factor becomes the first threshold, a flux command generated by the first flux-command generation unit is input to the vector control unit, and when the modulation factor is equal to or higher than the first threshold and the output frequency of the electric power converter is equal to or higher than the predetermined value, a flux command generated by the second flux-command generation unit is input to the vector control unit.

2. The vector control device for an electric motor according to claim 1, wherein the predetermined value is larger than the output frequency of the electric power converter when the modulation factor becomes 78.5%.

3. The vector control device for an electric motor according to claim 1, wherein the first flux-command generation unit executes constant flux control when the modulation factor is lower than the first threshold.

4. The vector control device for an electric motor according to claim 1, wherein the first flux-command generation unit executes control of generating a flux command that satisfies a loss minimizing condition based on the torque command.

5. The vector control device for an electric motor according to claim 3, wherein the first flux-command generation unit outputs a smaller flux command of a flux command generated by the constant flux control and a flux command generated by control of increasing a rotating speed by decreasing a field flux in the electric motor such that the modulation factor becomes the first threshold.

6. The vector control device for an electric motor according to claim 4, wherein the first flux-command generation unit outputs a smaller flux command of the flux command that satisfies the loss minimizing condition based on the torque command and a flux command generated by control of increasing a rotating speed by decreasing a field flux in the electric motor.

7. The vector control device for an electric motor according to claim 1, wherein the second flux-command generation unit generates a flux command for a synchronous PWM mode by control of increasing a rotating speed by decreasing a field flux in the electric motor when the modulation factor becomes equal to or higher than a second threshold, which is larger than the first threshold.

8. The vector control device for an electric motor according to claim 7, wherein the second threshold is equal to or lower than 95%.

9. A vehicle drive system that drives an electric vehicle, comprising:
the vector control device for an electric motor according to claim 1;
an electric power converter controlled by the vector control device;
an input circuit that generates DC power as an input to the electric power converter; and
an electric motor that is driven by the electric power converter.

10. The vehicle drive system according to claim 9, wherein at least one of a switching element and a diode element included in the electric power converter is formed of a wide bandgap semiconductor.

11. A vector control device for an electric motor that controls an electric power converter that converts DC power to AC power and supplies the AC power to the electric motor, the device comprising:
a vector control unit that computes an output voltage to be output from the electric power converter according to vector control based on a torque command and a flux command that are input, and generates a PWM signal for controlling the electric power converter based on the output voltage; and
a flux-command generation unit that generates a flux command for an asynchronous PWM mode and, when a modulation factor becomes equal to or higher than a first threshold, executes control of increasing a rotating speed by decreasing a field flux in the electric motor, wherein
when an output frequency of the electric power converter is lower than a predetermined value, which is higher than the output frequency when the modulation factor becomes the first threshold, a flux command generated by the flux-command generation unit is input to the vector control unit.

* * * * *